US008652280B2

(12) United States Patent
Wood

(10) Patent No.: US 8,652,280 B2
(45) Date of Patent: Feb. 18, 2014

(54) APPARATUS, SYSTEM, AND METHOD FOR MEDICAL STRUCTURE EMBELLISHMENTS

(76) Inventor: Tracie Diane Wood, Adrian, MI (US)

( * ) Notice: Subject to any disclaimer, the term of this patent is extended or adjusted under 35 U.S.C. 154(b) by 0 days.

(21) Appl. No.: 12/783,439

(22) Filed: May 19, 2010

(65) Prior Publication Data

US 2010/0224308 A1 Sep. 9, 2010

Related U.S. Application Data

(63) Continuation-in-part of application No. 12/214,005, filed on Jun. 16, 2008.

(51) Int. Cl.
*B29C 65/02* (2006.01)

(52) U.S. Cl.
USPC .................................. 156/84; 156/85; 156/86

(58) Field of Classification Search
USPC ...................................................... 156/84–86
See application file for complete search history.

(56) References Cited

U.S. PATENT DOCUMENTS

| 2,790,285 | A | | 4/1957 | Pike et al. | |
|---|---|---|---|---|---|
| 3,329,143 | A | | 7/1967 | Gordon | |
| 3,604,584 | A | | 9/1971 | Shank, Jr. | |
| 4,923,557 | A | | 5/1990 | Dickey | |
| 4,927,025 | A | * | 5/1990 | Thompson et al. | 206/575 |
| 5,070,630 | A | | 12/1991 | Edmundson | |
| D395,087 | S | | 6/1998 | Devries | |
| D484,604 | S | | 12/2003 | Tramel et al. | |
| 7,066,899 | B2 | | 6/2006 | Baron | |
| 7,314,457 | B2 | | 1/2008 | Reaux | |
| 2001/0002605 | A1 | | 6/2001 | Morawski et al. | |
| 2005/0161145 | A1 | * | 7/2005 | Record | 156/84 |
| 2009/0053451 | A1 | * | 2/2009 | Smith | 428/42.1 |
| 2009/0107615 | A1 | * | 4/2009 | Wood | 156/86 |

FOREIGN PATENT DOCUMENTS

| EP | 358451 A1 | * | 3/1990 |
|---|---|---|---|
| JP | 52060873 | | 5/1977 |
| TW | 589256 | * | 6/2004 |

OTHER PUBLICATIONS

Andrea Steed, Grafix Arts Shrink Film, Sep. 16, 2004, http://www.scrapjazz.com/topics/Techniques/Shrink_Film/330.php.*
Autum Lee, Healing art: Shrink film helps customize casts, medical equiptment, Jun. 22, 2009, Metrowest Daily News, http://www.metrowestdailynews.com/lifestyle/health/x1662362537/Healing-art-Shrink-film-helps-customize-casts-medical-equipment.*
Jessica Smith, Casttoo, www.casttoo.com, known about as early as Jun. 16, 2008.
Cast Decorating Kit, www.parknicollet.com/stores/ProductDetail.cfm?productid=CASTKI8807680, know about as early as Jun. 16, 2008.
Zula Decorative Cast Cover, www.selectmedproducts.com/castcover.html, know about as early as Jun. 16, 2008.

(Continued)

*Primary Examiner* — Daniel McNally
*Assistant Examiner* — Margaret Squalls
(74) *Attorney, Agent, or Firm* — Kunzler Law Group

(57) ABSTRACT

An apparatus, system, and method are disclosed for medical structure embellishments. The apparatus includes a medical structure that facilitates the mobility or healing of a patient. The apparatus also includes a heat source that outwardly radiates heat. Further, the apparatus includes a shrink-film structure cover that shrinks around a surface of the medical structure when the shrink-film structure cover is exposed to heat radiated from the heat source and a marking instrument adapted to mark the shrink-film structure with an embellishment.

18 Claims, 4 Drawing Sheets

(56) References Cited

OTHER PUBLICATIONS

Crutch Skins, www.crutchskins.com, know about as early as Aug. 1, 2010.
Shrinkable Skins, www.shrinkableskins.com, known about as early as Aug. 25, 2010.
U.S. Appl. No. 12/214,005 Office Action, Sep. 16, 2011.
U.S. Appl. No. 12/214,005 Office Action, Apr. 19, 2012.
U.S. Appl. No. 12/889,137 Office Action, Jun. 1, 2012.
U.S. Appl. No. 12/214,005 Office Action, Dec. 2, 2010.
U.S. Appl. No. 12/214,005 Office Action May 13, 2011.
U.S. Appl. No. 12/889,137 Office Action Nov. 14, 2011.
U.S. Appl. No. 12/889,137 Office Action, dated Nov. 14, 2011.

\* cited by examiner

APPARATUS, SYSTEM, AND METHOD FOR MEDICAL STRUCTURE EMBELLISHMENTS

CROSS-REFERENCES TO RELATED APPLICATIONS

This is a continuation-in-part application of and claims priority to U.S. patent application Ser. No. 12/214,005 entitled "Cast Art" and filed on Jun. 16, 2008 for Tracie Diane Wood, which is incorporated herein by reference.

BACKGROUND

1. Field of the Invention

The invention relates to an embellishment for medical structures and more particularly relates to the embellishment of medical structures using a shrink-film material to decorate a medical structure.

2. Description of the Related Art

When people are injured, they frequently require the aid of medical structures that help them deal with daily life. For example, some people use wheelchairs, walkers, crutches, and the like to improve mobility and stability. In another example, medical professionals have treated injured bones, joints, and surrounded soft tissue with orthopedic casts made in part of plaster based structural materials and more recent fiberglass based structural materials that harden to thereby substantially immobilize and support the injured area. Typically, medical professionals apply casts to limbs and torsos. Depending on the injury and injury treatment, the use of a medical structure can take a period of a few weeks to a lifetime.

In practice, when the medical structure is a cast, medical professionals apply a padding covering the injured area before applying the structural material. The padding is usually white in color and traditionally the structural material is white in color, but occasionally has a pigment in one of a few other select colors.

Because casts are temporary and are often replaced during the period of treatment, patients and their friends, relatives, and other individuals often decorate the cast with any number of drawings, sketches, slogans, hieroglyphics, phrases, comments, poetry, symbols, and the like. Children are particularly interested in decorating their casts and parents usually encourage this interest in that it creates an activity that is fun for them and may partly distract them from otherwise often traumatic issues associated with treatment. Psychologically, the decorations can become a badge of honor.

In the application of designs to the cast, individuals apply decorations directly to the cast's structural material using felt-pens, ballpoint pens, brushes, or other similar marking means that use ink, paint, or pencil lead. Once applied, the decorations are permanent and remain until cast removal. Sometimes these decorations are or become inappropriate. At other times, the decoration become marred as the cast becomes soiled. Sometimes the soiling of the cast and any inappropriate decorations may prevent people from keeping desired decorations on the cast as a memento.

Sometimes, the injury is more permanent and the patient will have to use a medical structure for a substantial portion of one's life. These medical structures, like wheelchairs, walkers, canes, and the like, come in standard colors and designs that fail to show the personality of the user. As the patient may use the medical structure for the rest of one's life, the patient may desire to augment the appearance of the medical structure.

SUMMARY

From the foregoing discussion, it should be apparent that a need exists for an apparatus, system, and method for medical structure embellishments. The present invention has been developed in response to the present state of the art, and in particular, in response to the problems and needs in the art that have not yet been fully solved by currently available systems. Accordingly, the present invention has been developed to provide an apparatus, system, and method for embellishing the appearance of medical structures that overcome many or all of the above-discussed shortcomings in the art.

The apparatus, in one embodiment, is configured to include a medical structure that facilitates the mobility or healing of a patient and a heat source that radiates heat. The apparatus may further include a shrink-film structure cover that shrinks around a surface of the medical structure when the shrink-film structure cover is exposed to heat radiated from the heat source. Further, the apparatus may include a marking instrument adapted to mark the shrink-film structure with an embellishment. In certain embodiments, the medical structure may be a cast, a wheel chair, a walker, a crutch, a cane, and the like.

In further embodiments, the marking instrument may print the embellishment on the shrink-film structure cover. The shrink-film structure cover may be an individual sheet of shrink-film material, a roll of shrink-film material, and a pre-made sleeve of shrink-film material. Further, the apparatus may include a quantity of heat-shrinkable adhesive tape that secures the shrink-film structure cover around the medical structure. The heat-shrinkable adhesive tape and/or the shrink-film structure cover may have a surface gloss finish, a surface matte finish, a pigment, a transparent appearance, a translucent appearance, a clear appearance, an opaque appearance, and the like.

In at least one embodiment, the shrink-film structure cover may be a pre-made sleeve of shrink-film material having a cross-section with a circumference that approximates a peripheral distance around the medical structure. Further, the marking instrument may be a plurality of marking instruments each adapted to mark the shrink-film structure cover in a different color. Alternatively, the marking instrument may be a felt-pen like instrument. In certain embodiments, the heat source may be a hot-air hairdryer, a shrink wrap heat gun, a hot-air heater, a heating element, and the like.

A method of the present invention is also presented for embellishing the appearance of medical structures. The method in the disclosed embodiments substantially includes the steps necessary to carry out the functions presented above with respect to the operation of the described apparatus and system. In one embodiment, the method includes identifying a portion of a medical structure to be embellished and selecting a portion of a shrink-film structure cover to cover the portion of the medical structure. The method also may include surrounding a portion of the medical structure with the shrink-film structure cover and applying sufficient heat to cause the shrink-film structure cover to contract around the portion of the medical structure, wherein the shrink-film structure cover establishes a conforming circumferential relationship with the portion of the medical structure.

In a further embodiment, the method includes applying an embellishment to the shrink-film structure cover with a marking instrument before applying sufficient heat to cause the shrink-film structure cover to contract. Also the method may further include applying a heat-shrinkable adhesive tape to the shrink-film structure cover, where the shrink-film structure cover is a sheet of shrink-film material having an overall surface, an edge, and a surface-area adjacent to the edge and applying the heat-shrinkable adhesive tape to the surface-area adjacent to the edge and a portion of the overall surface and another surface-area adjacent to another edge to fashion a joint thereby establishing a substantially sleeve like configuration of the shrink-film structure cover for surrounding the portion of the medical structure.

In at least one embodiment, the method includes applying sufficient heat with a handheld hot-air hairdryer like device. Further, the method may include applying an additional layer of the shrink-film structure cover over a first layer of the shrink-film structure cover. Also, the method may include marking the heat-shrink structure cover with an embellishment before surrounding the portion of the medical structure with the shrink-film structure cover. The method may also include marking the heat-shrink structure cover with an embellishment after applying sufficient heat.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Packagers have used shrink-film polymers for many years to wrap products. Common films use polyolefin polymer, such as, polypropylene or polyethylene, or polyvinyl chloride (PVC) polymer. Other shrink-film polymers include polystyrene and glycol-modified polyester. Recently, packagers have begun to consider biodegradable polymers, such as film based on polylactic acid. The shrink-film helps protect products from damage and contamination during handling and shipment, prevent loss of bundled components from theft, or to indicate product tampering. A distinguishing characteristic of shrink-film is its ability upon exposure to a level of heat energy to shrink or create shrink-tension within the film if it is restrained. Examples of wrapped items include: cans, jars, bottles, compact disk recordings, toys, food products, gift baskets, household items, hardware components, windows, and the like.

Figure 1:
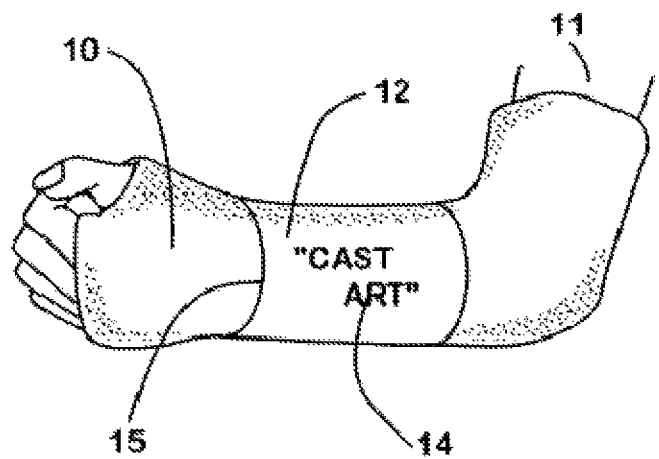
FIG. 1 is a perspective view illustrating one embodiment of an orthopedic cast having a shrink film embellishment in accordance with the present invention.

FIG. 1 illustrates a typical orthopedic cast 10 for an arm 11 of a human. Medical professionals treat many injuries with medical structures. The phrase "medical structure," as used herein, refers to any structure that a person uses to heal from an injury, increase mobility, or ease the rigors of life for a patient. For example, medical professionals treat injured bones, joints, and surrounding soft tissue of humans and animals using the orthopedic cast 10 made in part of plaster based structural materials and fiberglass based structural materials that harden to thereby substantially immobilize and support the injured area. While FIG. 1 illustrates the arm 11, medical professionals use casts 10 for immobilizing other limbs as well as other body parts.

In certain embodiments, orthopedic casts 10 are temporary and often replaced during the period of treatment. Patients and their friends, relatives, and other individuals often directly adorn the cast 10 with a number of drawings, sketches, slogans, hieroglyphics, phrases, comments, poetry, symbols, and the like (not illustrated). FIG. 1 shows an apparatus for adorning the cast 10 without necessarily marking or creating renderings on the cast 10 directly. For example, a user may cover a portion of the cast 10 with a shrink-film structure cover 12 having a decoration 14 and the user may cause the shrink-film structure cover 12 and its decoration 14 to establish a circumferentially conforming relationship 15 with the cast 10. Manufacturers of the shrink-film structure cover 12 sometimes refer to the shrink-film structure cover 12 as shrink wrap and occasionally as stretch film or stretch wrap.

Figure 2:
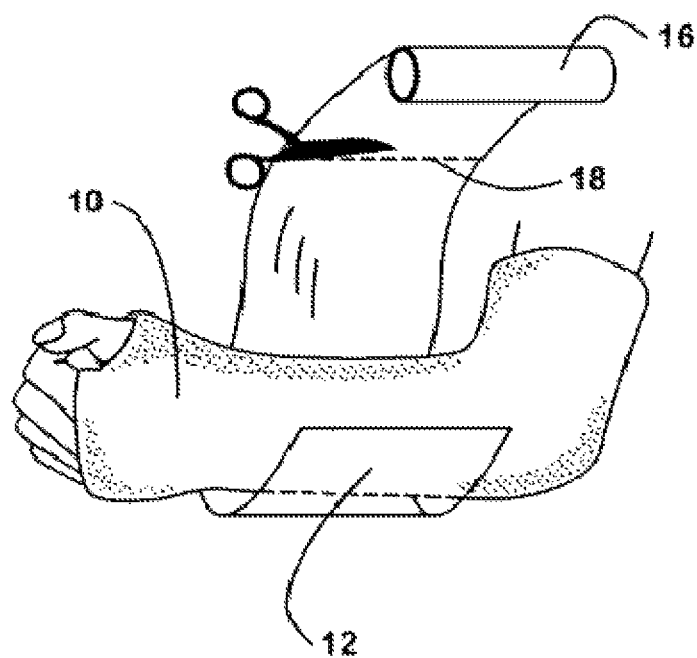
FIG. 2 is a perspective view illustrating the orthopedic cast with a roll of shrink film material in accordance with the present invention.
Figure 3:
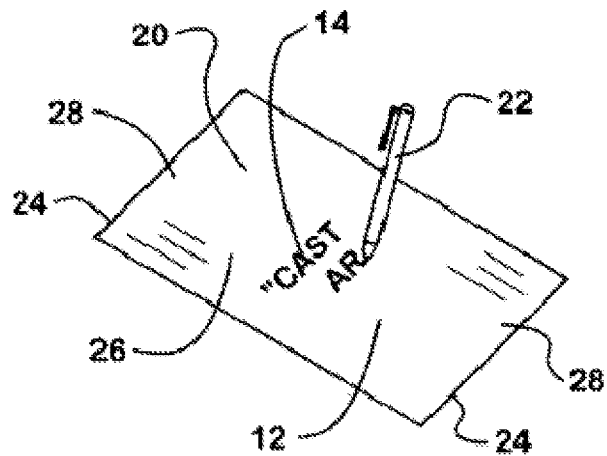
FIG. 3 is a perspective view of the roll of shrink film material with a decoration in accordance with the present invention.

In at least one embodiment, the cast 10 may have a circumference or a peripheral distance of some dimension that is slightly different for each specific orthopedic treatment application. Moreover, the circumference or peripheral distance may be different at one end of the cast 10 from another end. FIG. 2 illustrates cutting along a line 18 a quantity of shrink-film structure cover 12 from a roll 16 sufficient to wrap around the cast 10 somewhat snugly thereby substantially shaping the shrink-film structure cover 12 into a sleeve 19 configuration (see FIG. 4). This quantity of shrink-film structure cover 12, when substantially flat, may form a sheet 20 (see FIG. 3) having an overall surface 26, at least one edge 24, and a surface-area 28 adjacent to the edge 24. In a preferred embodiment, using a marking instrument 22, patients and their friends, relatives, and other individuals can create or render the shrink-film decoration 14 with relative ease directly onto the overall surface 26 of shrink-film structure cover 12 while it remains flat.

Figure 4:
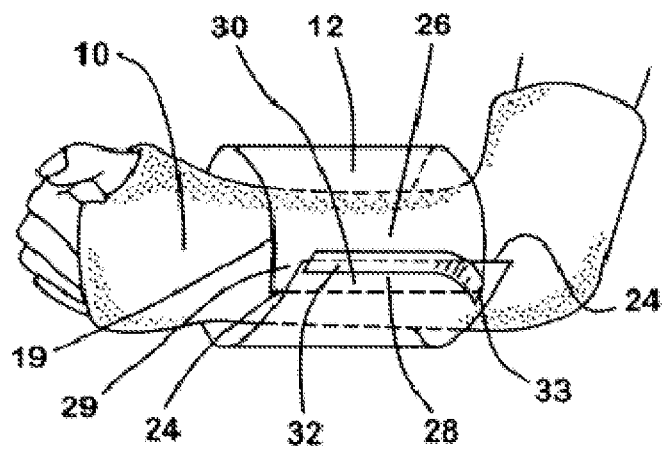
FIG. 4 is a perspective view of a sheet of shrink film material being applied to the orthopedic cast in accordance with the present invention.

In FIG. 4, edges 24, in certain embodiments, may slightly overlap at vicinity 29. The patient and their friends, relatives, and other individuals may cut shrink-film structure cover 12 along line 18 such that the shrink-film structure cover 12 approximates the peripheral distance around the cast 10. A strip of a heat-shrinkable adhesive tape 32 may engage with one surface-area 28 adjacent to the edge 24 with a portion of the overall surface 26 to fashion an overlapping-joint 30 thereby completing construction of sleeve 19 around cast 10. Construction of sleeve 19 with overlapping-joint 30 may allow minor fit adjustments to the shrink-film structure cover 12 around the cast 10 to easily accommodate the cast 10 at places having different peripheral distance dimensions without making additional cuts to the shrink-film structure cover 12 in order to fine-tune its size. Furthermore, allowing easy snug construction of the sleeve 19 may speed the approach for adorning or embellishing the cast 10 while minimizing the shrink-film structure cover 12 contraction to thereby establish the conforming relationship 15 with the cast 10.

Figure 5:
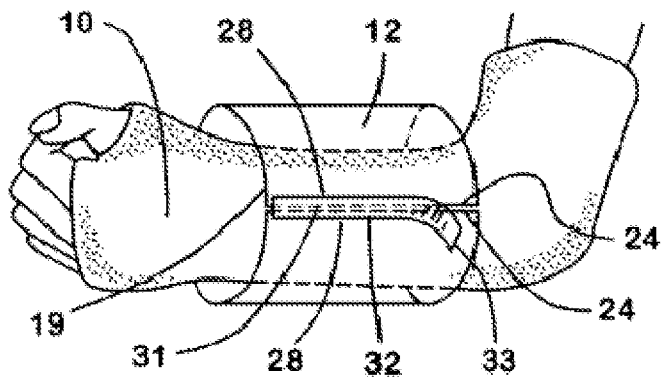
FIG. 5 is a perspective view similar to FIG. 4 illustrating an embodiment where edges of the shrink-film material are substantially adjacent to each other in accordance with the present invention.

FIG. 5 shows an alternative approach to that shown in FIG. 4. In this alternative embodiment, the patient and their friends, relatives, and other individuals may cut the shrink-film structure cover 12 so that edges 24 establish a bridge joint 31 without overlap. The strip of the heat-shrinkable adhesive tape 32 may engage two surface-areas 28 adjacent to the respective edges 24 to fashion the bridge joint 31 between the two edges 24. Portion 33 shown in FIG. 4 and FIG. 5 of the heat-shrinkable tape 32 may be in full contact with the shrink-film structure cover 12. FIG. 4 and FIG. 5 shows the strip of heat-shrinkable adhesive tape 32 as partially engaged at portion 33 with the shrink-film structure cover 12 to respectively illustrate features of overlapping joint 30 and bridge joint 31. The heat-shrinkable adhesive tape 32 may be a quantity in a shape of a roll (not illustrated) from which the patient and their friends, relatives, and other individuals may cut strips and/or a quantity in a shape of pre-cut strips.

Figure 6:
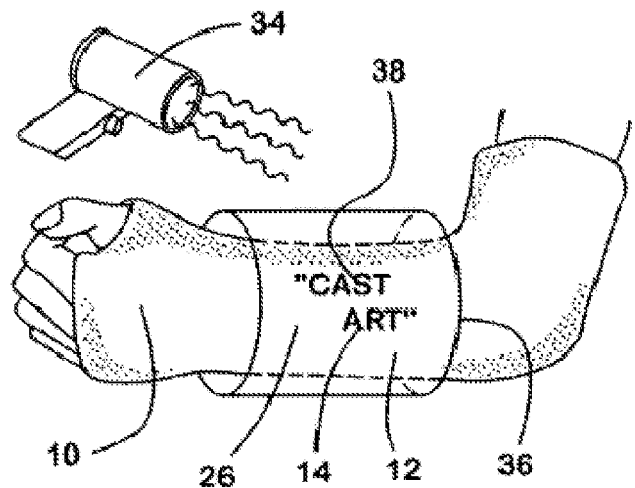
FIG. 6 is a perspective view of the orthopedic cast with the shrink-film material around the cast before an application of heat energy in accordance with the present invention.

In certain embodiments, the application of heat energy from a heat source 34 in FIG. 6 may cause the shrink-film structure cover 12 to establish the circumferentially conforming relationship 15 with the cast 10. While shrink-film structure cover 12 may have tailored performance parameters, such as a greater degree of shrinkage in one direction over another or reduced shrinkage in all directions, general-purpose material suitable for embellishing cast 10 may contract in uniaxial substantially perpendicular directions typically up to approximately 60% of its original size, perhaps more for some polymers. Nonetheless, using a tailored shrink-film polymer that shrinks mostly in a transverse direction than in an axial direction may be useful in certain cast 10 adornment applications.

Shrink-film structure cover 12 may be a thermoplastic polymer such as polyolefin (that is, polyethylene, polypropylene) or polyvinyl chloride or other polymer materials. Manufacturers produce shrink-film structure cover 12 by a number methods generally involving biaxially stretching or orientating the polymer's molecular structure quickly followed by a rapid cooling while restrained in its stretched condition to substantially freeze the polymer's molecular structure in the stretched state. Heat energy from the heat source 34 may cause the shrink-film structure cover 12, that is, its stretched or oriented molecular structure, to release thereby generally return the polymer to substantially to its original un-stretched state.

Releasing this frozen molecular structure of common shrink-film structure cover 12 requires relatively little heat energy. Accordingly, the heat source 34 is likely a handheld heat gun specifically for use with shrink-film material; however, the patient and their friends, relatives, and other individuals may also use a common handheld hot-air hairdryer, other heat source, or the like Likewise, the heat-shrinkable adhesive tape 32 may be a form of shrink-film structure cover 12 adapted with a pressure sensitive rubber resin coating applied to one side.

Figure 7:
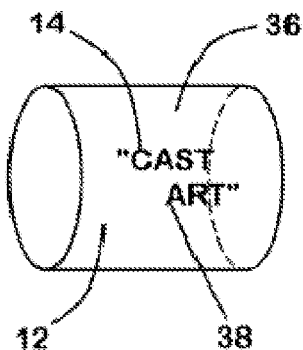
FIG. 7 is a perspective view of a pre-made sleeve embodiment of the shrink-film material in accordance with the present invention.

FIG. 7 illustrates an alternative configuration of shrink-film structure cover 12 as a pre-made sleeve 36. The pre-made sleeve 36 can be a tube without a seam. Alternately, pre-made sleeve 36 may have a joined structure wherein two ends of the shrink-film material in the sheet 20 form are pre-attached by some means perhaps similar to the overlapping joint 30 or the bridge joint 31 using an adhesive or pre-attached with a polymer welding process. In certain embodiments, the circumference of the pre-made sleeve 36 may approximate the peripheral distance of the cast 10. If the circumference is too large, the shrink-film structure cover 12 in the pre-made sleeve 36 may not contract sufficiently to establish the necessary circumferential conforming relationship 15 with the orthopedic cast 10.

Figure 8:
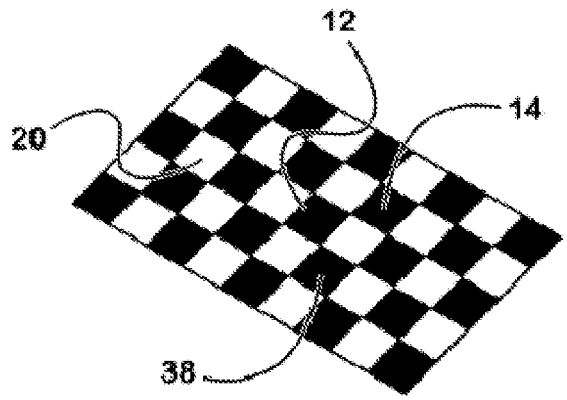
FIG. 8 is a perspective view similar to FIG. 3 illustrating an embodiment where the decoration is a printing on the shrink-film material in accordance with the present invention.

FIG. 8 illustrates an alternative embodiment where the shrink-film decoration 14 may be a printing 38. Generally, others may apply this printing 38 to the shrink-film structure cover 12 beforehand by a number of common processes including digital-printing processes. While the specific decoration 14 illustrated in FIG. 8 may be a "checker board" rendering, the shrink-film decoration 14 can be of any rendering limited only by imagination. Examples of shrink-film decorations 14, without limiting scope, can include: heart configurations for Valentine's Day, happy faces, stripes to simulate a candy cane at Christmas time, plaids similar to those Scots use to distinguish clans, typical tattoo art, famous logos (with appropriate license) such as those of, COCA COLA, HARLEY DAVIDSON, FORD, CHEVROLET, WALT DISNEY, and the like.

Furthermore, decoration or shrink-film decoration 14 is not limited solely to markings or renderings on the shrink-film materials 12, but also may include adornments or embellishments that alter the surface texture of the cast 10 via use of shrink-film materials 12, such as, alterations in surface gloss and color. While the polymers of many shrink-film materials 12 and heat-shrinkable adhesive tapes 32 are water-clear transparent with high glossy surface finish, modifications to these polymers during manufacture may allow other alternatives. The shrink-film structure cover 12 and the heat-shrinkable adhesive tape 32 may have a surface gloss finish, a surface matte finish, and a pigment. The pigment may be a light tint that maintains a transparent or a translucent character to the shrink-film structure cover 12. Alternatively, the pigment in certain polymer formulations may cause the shrink-film structure cover 12 and the heat-shrinkable adhesive tape 32 to become opaque. Opaque shrink-film materials 12 may be useful to conceal markings previously applied directly to the cast 10. The shrink-film decoration 14 may be a combination of one or more: printings 38, renderings with the marking instrument 22, changes in transparency, changes in surface gloss, and changes in color.

In at least one embodiment, the marking instrument 22 that the patient and their friends, relatives, and other individuals may use is a felt-pen like instrument. The felt-pen may have a point made of felt or a similar compressed fiber that allows ink to flow as the point travels across the overall surface 26 of the shrink-film structure cover 12. Moreover, felt-pens may be available in a number of different colors and point sizes that allow for unique renderings. In an alternative embodiment, the marking instruments 22 may include a ballpoint configuration or use a graphite polymer pencil lead, paint, or the like may be appropriate. The marking or rendering may be relatively permanent readily adhering to the shrink-film structure cover 12 and withstanding contraction during the application of heat energy with the heat source 34. Adornments applied to the shrink-film structure cover 12 may slightly distort from subsequent contraction that establishes the conforming relationship 15 of the shrink-film structure cover 12 with the cast 10.

In certain embodiments, shrink-film materials 12 may have two sides with a topside surface and an underside surface (not illustrated). Printings 38 that are part of the decoration 14 may be on the underside in direct contact with the cast 10. In this way, the shrink-film structure cover 12, particularly if transparent, allows viewing while it provides a layer of protection to the decoration 14 from possible damage from normal wear and tear. Printings 38 on the underside of the shrink-film structure cover 12 may help when using the pre-made sleeve 36 in a narrow band width, for example, tattoo art or famous logo renderings.

In a further embodiment, markings made with the marking instrument 22 may be on the topside surface of the shrink-film structure cover 12 as the patient and their friends, relatives, and other individuals may not be able to create markings in reverse that become part of the decoration 14. Accordingly, markings or renderings on the topside surface of the shrink-film structure cover 12 may be more prone to damage. Consequently, the patient and their friends, relatives, and other individuals may add or overlay a second sleeve 19 or pre-made sleeve 36 that is transparent or translucent for additional protection of topside renderings.

In certain embodiments, the ability to remove the decoration 14 may allow the patient to reapply the decoration 14 to another cast 10 if medical professionals replace the cast 10 during treatment. Shrink-film structure cover 12 may have, within limits, the capability to further shrink and re-establish the conforming relationship 15. Moreover, the synthetic rubber resin adhesive located on the heat-shrinkable adhesive tape 32 may remain sufficiently active to permit re-establishment of the overlapping joint 30 and bridge joint 31. Further, the heat-shrinkable adhesive tape 32 may be removable allowing reapplication of a fresh strip of heat-shrinkable adhesive tape 32. Removal of the decoration 14 may allow the patient to retain the decoration 14 as a memento once treatment ends.

Figure 9:
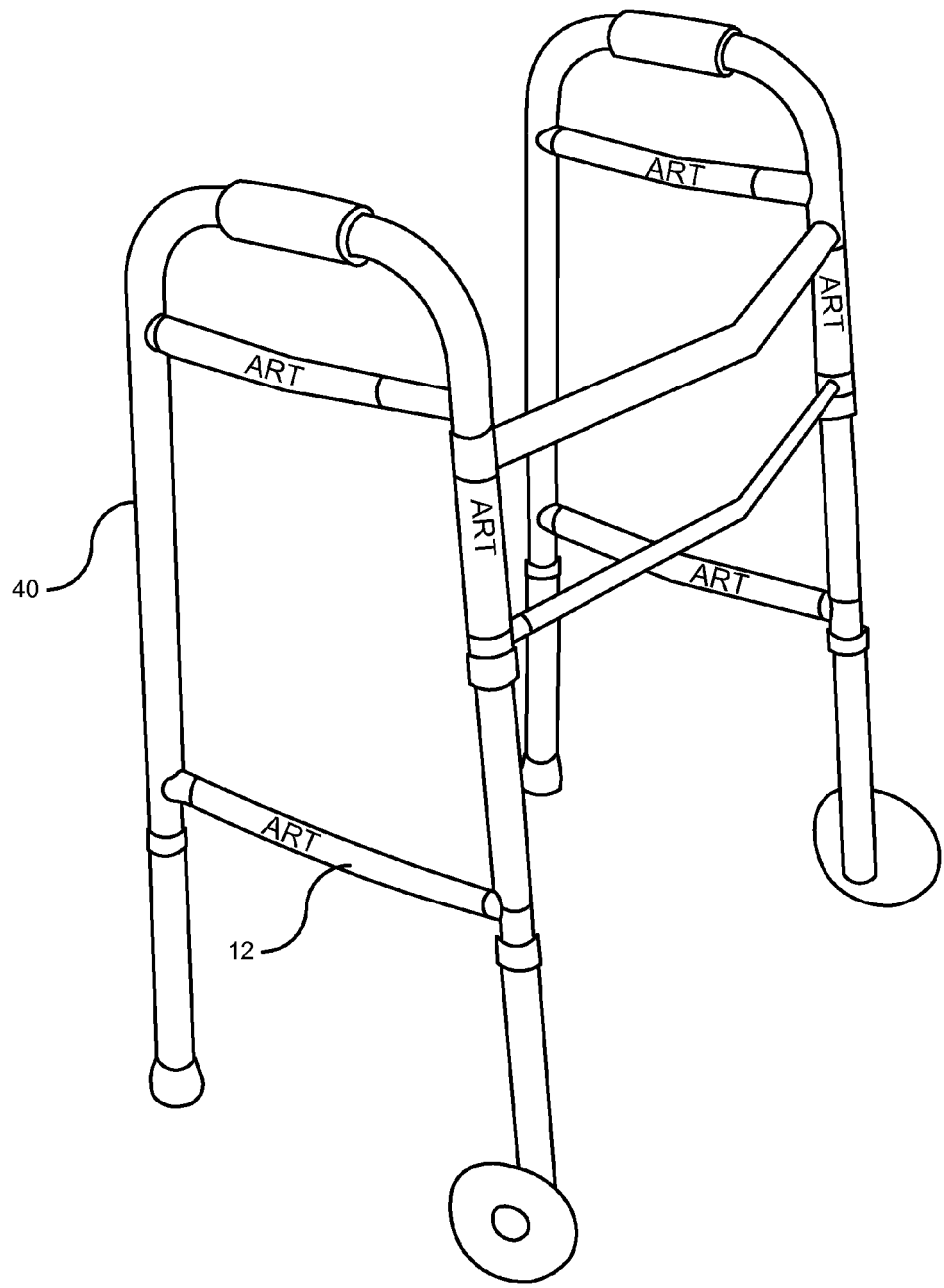
FIG. 9 is a perspective view of a walker having shrink film embellishments in accordance with the present invention.

FIG. 9 shows the application of the shrink-film structure cover 12 to a walker 40. The shrink-film structure cover 12 may be applied to several different medical structures. For example, a patient may use the aforementioned methods for applying the shrink-film structure cover 12 to a cast 10 for applying the shrink-film structure cover 12 to the walker 40. Further, a patient, friends, and medical practitioners may also apply the shrink-film structure cover 12 to wheelchairs, motorized wheelchairs, canes, crutches, bed frames, and the like. Further, the patient and friends may also embellish the appearance of the shrink-film structure cover 12 as was explained with the cast 10.

In at least one embodiment, sales and marketing of products to embellish the orthopedic cast 10 and other medical structures may involve establishing a collection or portfolio of embellishing components from which the patient and their friends, relatives, and other individuals can select specific items or restock portfolio items previously used. The portfolio may include the shrink-film structure cover 12 and the marking instrument 22 to allow the patient and their friends, relatives, and other individuals to create renderings that add to and become part of the decoration 14 on the shrink-film structure cover 12 and/or other shrink-film decorations 14 involving printings 38 and/or changes in color, tint, and/or surface texture. The shrink-film structure cover 12 may be in individual sheets 20 that are precut into typical sizes that are suitable for common medical treatments, in roll 16 form allowing the patient and their friends, relatives, and other individuals to custom size a number of the sheets 20, and/or pre-made sleeves 36 also in suitable sizes for common medical treatments. The portfolio may further include heat-shrinkable adhesive tape 32 to allow the patient and their friends, relatives, and other individuals to construct a sleeve 19 from the sheets 20. The heat-shrinkable adhesive tape 32 may be in a roll form (not illustrated) from which the patient and their friends, relatives, and other individuals may cut individual strips and/or pre-cut strips of corresponding size to the shrink-film structure cover 12 that is part of the portfolio. Further, the portfolio may include a storage container, such as a box or the like (not illustrated) having specialized compartments for various embellishing components.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a medical appliance that facilitates mobility or healing of a patient;
   wherein the medical appliance comprises at least one of a wheel chair, a walker, a cane, or a crutch;

a shrink-film cover comprising a sheet of shrink-film material having a first edge and an opposing second edge, the shrink-film cover configured to shrink around a surface of the medical appliance when the shrink-film cover is exposed to heat radiated from a heat source;

a heat-shrinkable adhesive tape for connecting the first edge with the opposing second edge such that the sheet forms a sleeve; and a plurality of colored markings instruments adapted to mark the shrink-film cover, the plurality of colored marking instruments comprising a plurality of different colors, wherein the shrink-film cover comprises a surface for retaining a marking from one or more of the plurality of colored marking instruments.

2. The system of claim 1, wherein each marking instrument of the plurality of marking instruments is selected from the group consisting of a felt-tip pen, a ballpoint pen, and a pencil.

3. The system of claim 1, wherein the shrink-film cover comprises at least one of:
an individual sheet of shrink-film material; and
a roll of shrink-film material.

4. The system of claim 1, wherein the heat-shrinkable adhesive tape is in the shape of one of a continuous roll and a pre-cut.

5. The system of claim 1, wherein the heat-shrinkable adhesive tape has at least one of:
a surface gloss finish;
a surface matte finish;
a pigment;
a transparent appearance;
a translucent appearance;
a clear appearance; and
an opaque appearance.

6. The system of claim 1, wherein the shrink-film cover has at least one of:
a surface gloss finish;
a surface matte finish;
a pigment;
a transparent appearance;
a translucent appearance;
a clear appearance; and
an opaque appearance.

7. The system of claim 1, wherein the shrink-film cover has a circumference greater than a peripheral distance around the medical appliance.

8. The system of claim 1, wherein the marking instrument is a plurality of marking instruments each adapted to mark the shrink-film cover in a different color.

9. The system of claim 1, wherein the marking instrument is a felt-pen like instrument.

10. The system of claim 1, wherein the heat source comprises at least one of:
a hot-air hairdryer;
a shrink wrap heat gun;
a hot-air heater; and
a heating element.

11. A method comprising:
identifying a portion of a medical appliance to be embellished;
wherein the medical appliance comprises at least one of a wheel chair, a walker, a cane, or a crutch;

selecting a portion of a shrink-film cover to cover the portion of the medical appliance, the shrink-film cover comprising a sheet of shrink-film material having a first edge and an opposing second edge, wherein the sheet of shrink-film material has a colored shrink-film decoration printed on a surface of the shrink-film material;

surrounding a portion of the medical appliance with the shrink-film cover by connecting the first edge with the opposing second edge with a heat-shrinkable adhesive tape such that the sheet forms a sleeve; and applying sufficient heat to cause the shrink-film cover to contract around the portion of the medical appliance, wherein the shrink-film cover establishes a conforming circumferential relationship with the portion of the medical appliance.

12. The method of claim 11, further comprising applying an embellishment to the shrink-film cover with a marking instrument before applying sufficient heat.

13. The method of claim 11, wherein the shrink-film cover has an overall surface, a surface-area adjacent to the first edge, and another surface-area adjacent to the second edge, wherein surrounding the portion of the medical appliance further comprises:
applying the heat-shrinkable adhesive tape to the surface-area adjacent to the first edge and a portion of the overall surface and the another surface-area adjacent to the second edge to fashion a joint thereby establishing a substantially sleeve like configuration of the shrink-film cover for surrounding the portion of the medical appliance.

14. The method of claim 11, wherein applying sufficient heat further comprises applying sufficient heat with a hand-held hot-air hairdryer like device.

15. The method of claim 11, further comprising applying an additional layer of the shrink-film cover over a first layer of the shrink-film cover.

16. The method of claim 11, further comprising marking the heat-shrink cover with an embellishment before surrounding the portion of the medical appliance with the shrink-film cover.

17. The method of claim 11, further comprising marking the heat-shrink cover with an embellishment after applying sufficient heat.

18. A system comprising:
a medical appliance that facilitates mobility or healing of a patient;
wherein the medical appliance comprises at least one of a wheel chair, a walker, a cane, or a crutch;
a shrink-film cover comprising a sheet of shrink-film material having a first edge and an opposing second edge, the shrink-film cover configured to shrink around a surface of the medical appliance when the shrink-film cover is exposed to heat radiated from a heat source, wherein the sheet of shrink-film material has a colored shrink-film decoration printed on a surface of the shrink-film material; and
a heat-shrinkable adhesive tape that secures the shrink-film cover around the medical appliance by connecting the first edge with the opposing second edge such that the sheet forms a sleeve.

* * * * *